United States Patent [19]

Tazaki et al.

[11] Patent Number: 5,550,337
[45] Date of Patent: Aug. 27, 1996

[54] EXHAUST SYSTEM FOR A SMALL PLANING CRAFT

[75] Inventors: Hiroshi Tazaki; Kazumasa Ito; Atsushi Sugawara, all of Hamamatsu, Japan

[73] Assignee: Sanshin Kogyo Kabushiki Kaisha, Shizuoka-ken, Japan

[21] Appl. No.: 918,940

[22] Filed: Jul. 22, 1992

Related U.S. Application Data

[63] Continuation of Ser. No. 593,779, Oct. 5, 1990, abandoned.

[30] Foreign Application Priority Data

Oct. 6, 1989 [JP] Japan ...................................... 1-261701

[51] Int. Cl.⁶ ....................................................... F01N 7/12
[52] U.S. Cl. ............................ 181/235; 181/269; 440/89
[58] Field of Search ..................................... 181/212, 235, 181/264, 265, 269, 272, 282, 283; 440/88, 89, 54; 60/310, 313

[56] References Cited

U.S. PATENT DOCUMENTS

| | | | |
|---|---|---|---|
| 4,019,456 | 4/1977 | Harbert | 181/235 |
| 4,312,422 | 1/1982 | Matsushita et al. | 181/272 |
| 4,607,723 | 8/1986 | Okazaki | 181/272 |
| 4,799,905 | 1/1989 | Broughton et al. | 181/272 X |
| 5,067,448 | 11/1991 | Nakase et al. | 60/310 |
| 5,096,446 | 3/1992 | Tazaki et al. | 440/89 |
| 5,696,446 | 3/1992 | Tazaki et al. | 440/89 X |

*Primary Examiner*—Michael L. Gellner
*Attorney, Agent, or Firm*—Knobbe, Martens, Olson & Bear

[57] ABSTRACT

An exhaust silencing system for a small planing craft includes a first expansion chamber housing on one side of a water craft which transmits exhaust gases and waste cooling water to a second expansion chamber housing which may have a number of expansion chambers. A long exhaust pipe extends from the second expansion chamber housing to the atmosphere.

15 Claims, 6 Drawing Sheets

EXHAUST SYSTEM FOR A SMALL PLANING CRAFT

This is a continuation of U.S. patent application Ser. No. 07/593,779, filed Oct. 5, 1990, now abandoned.

BACKGROUND OF THE INVENTION

This invention relates to an exhaust silencer unit for a marine propulsion unit and more particularly to an improved expansion chamber type of silencing device for the exhaust gases of a small planing marine propulsion unit.

It is well known that the exhaust gases of internal combustion engines can, if emitted to the atmosphere unmuffled, create substantial noise. It has, therefore, been the practice to provide some form of silencing device in the exhaust system for such engines. The problems of silencing the exhaust gases of an internal combustion engine are magnified when the engine runs over a wide range of speeds and load conditions since the tuning of the exhaust system for these varying conditions can give rise to substantial problems. In addition, when the exhaust system is used in a marine vehicle, still further problems are encountered because of the relatively small space and confined area in which the exhaust system may be provided. This is particularly true for a small planing craft where the space is limited.

Exhaust silencing is dependent upon and proportional to the path length between the engine and the end of the exhaust path. The longer the exhaust path, the greater the degree of silencing. Any increase in path length, however, usually involves an increase in the volume and area of a watercraft to accommodate the increased path length.

In addition, an expansive apparatus for silencing exhaust is usually bulky and can unbalance a watercraft when concentrated in the spaces available to accommodate exhaust silencers. The exhaust silencer for a watercraft also must provide water locking, that is, the stoppage of water from backflowing into the engine. Some exhaust systems are resistive to water backflow but do not waterlock under the most extreme conditions such as capsizing of the watercraft.

An improved exhaust silencer for the exhaust gases of an internal combustion engine, of high efficiency and having relatively small size, is needed for a marine propulsion unit.

An improved exhaust silencer unit for a marine propulsion unit would have a compact, balanced configuration and yet provide good silencing under a wide range of engine running conditions, and sufficient water locking.

The use of expansion chambers in exhaust systems is well known to achieve good silencing. The expansion chamber is effective to produce the good silencing under a wide range of load conditions and the number of expansion chambers employed in the exhaust system can significantly improve the silencing. However, in connection with marine propulsion units it has been difficult to provide plural expansion chambers due to the relatively small size and compact nature required for the exhaust system.

In addition, it is well known in marine propulsion units to mix the coolant from the engine cooling system with the exhaust gases and discharge them together. This provides a simplicity in the plumbing arrangement for the engine and also the addition of the cooling water to the exhaust gases can improve silencing. However, it must be ensured that the coolant from the engine cooling jacket in addition to the previously mentioned water from the body of water in which the watercraft is operating does not re-enter the engine through the exhaust system which could cause damage to the engine. Therefore, an exhaust system for a marine propulsion unit embodying multiple expansion chambers and which ensures that water cannot re-enter the engine through exhaust ports is necessary.

SUMMARY OF THE INVENTION

This invention is adapted to be embodied in a small water craft and includes an exhaust silencer for the exhaust gases of an internal combustion engine balanceably located in the water craft and comprises a first expansion chamber housing and an exhaust inlet for accepting exhaust gases from the engine to the first expansion chamber. A second expansion chamber housing receives exhaust gases from the first expansion chamber housing, and generally contains a series of expansion chambers. The first expansion chamber of the second expansion chamber housing communicates with and is spaced apart from a second expansion chamber. A second expansion chamber communicates with and is spaced apart from a third expansion chamber. A third expansion chamber communicates with a fourth, and so on. The path within the second expansion chamber housing is circuitous. Exhaust gases are discharged to the atmosphere through a long exhaust pipe extending along the length of the watercraft from the last expansion chamber of the second expansion chamber housing.

DETAILED DESCRIPTION OF THE PREFERRED EMBODIMENTS

Figure 1:
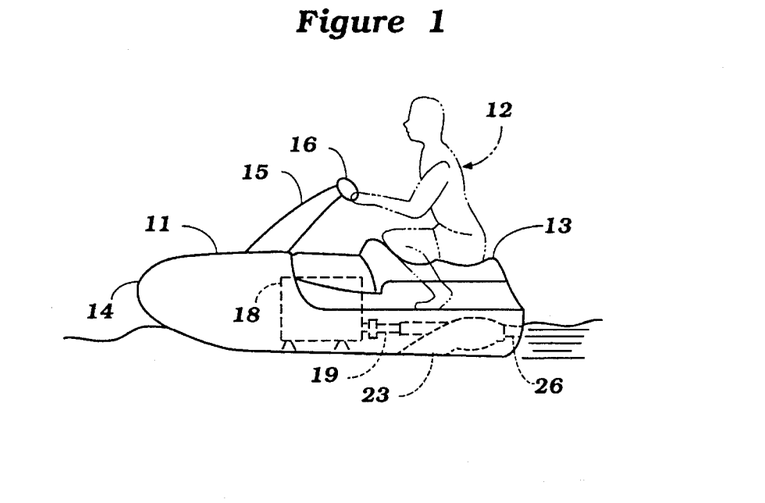
FIG. 1 is a side elevational view of a small watercraft having an exhaust system constructed in accordance with an embodiment of the invention.
Figure 2:
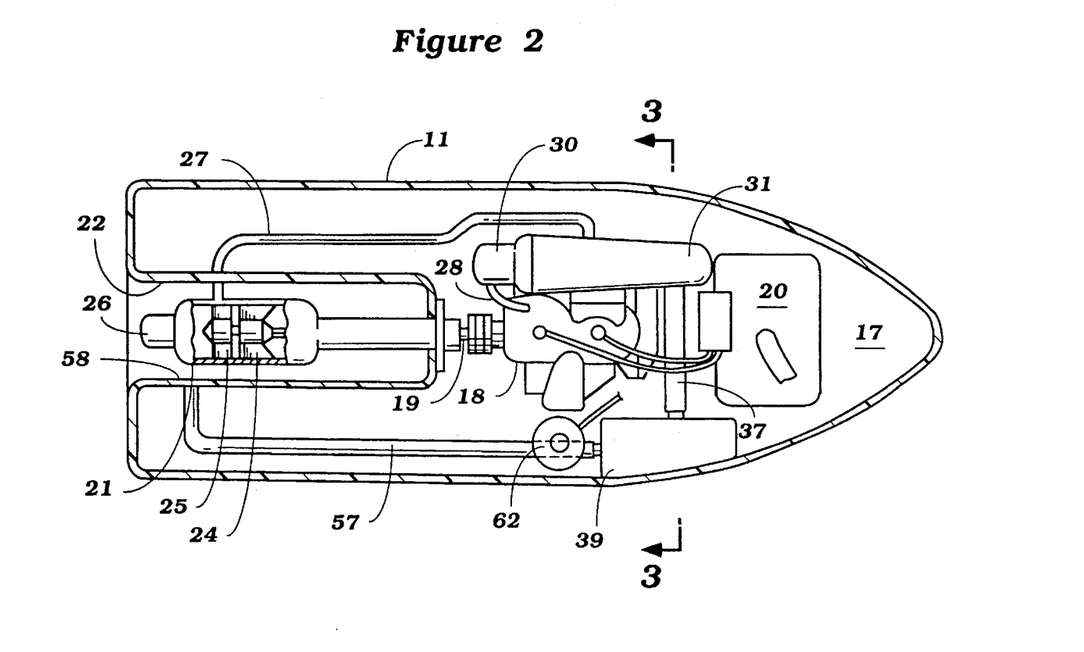
FIG. 2 is an enlarged top elevational view of the watercraft, with a portion of the hull removed so as to more clearly show the internal construction.

Referring first to FIGS. 1 and 2, a small water craft constructed in accordance with an embodiment of the inventions is identified generally by the reference numeral 11. The water craft 11 is of the type that is designed to be operated by a single rider, shown in phantom and identified by the reference numeral 12, seated in straddle fashion on a seat 13.

The seat 13 is carried at the rear portion of a hull 14 behind a mast 15 on which a tiller 16 is provided for control of the watercraft. A similar device is described in co-pending application Ser. No. 07/569,998 filed Aug. 20 1990, entitled EXHAUST SILENCER UNIT FOR PROPULSION UNIT, filed in the name of Hiroshi Tazaki et al, which is assigned to the assignee of this application.

The hull 14 has a forwardly position engine compartment 17 in which an internal combustion engine, indicated generally by the reference numeral 18, is positioned. As may be clearly seen in FIG. 2 and 3, the engine 18 is positioned within the hull 11 so as to lie substantially along a longitudinal center plane of the hull. The engine 18 may be of any known type and, in the illustrated embodiment, is of the two-cylinder, two-cycle crankcase compression type. It is to be understood, however, that the invention, which relates to the exhaust system to be hereinafter described, can be utilized with a wide variety of engine types.

The engine 18 drives an output shaft which is coupled to the input shaft 19 at a point aft of a fuel tank 20. The input shaft 19 is connected to a jet propulsion unit, indicated generally by the reference numeral 21. The jet propulsion unit 21 is positioned within a tunnel 22 formed outside hull 14 and aft of the engine compartment 17 and underlying the operator's seat 13. The jet propulsion unit includes a downwardly facing water inlet 23 through which water is drawn by an impeller 24 that is drivingly coupled to the input shaft 19. This water is then discharged past straightening vanes 25 to a steering nozzle 26 for propulsion and steering of the watercraft 11 in a well known manner.

The engine 18 is provided with a cooling system that draws water from the body of water in which the water craft 11 is operating and then discharges it back to this body of water through the exhaust system to be described. This cooling system includes a coolant inlet conduit 27 that draws water from the jet propulsion unit 21 and which water is pressurized by the impeller 24. The water then flows through the internal cooling jacket of the engine and is discharged therefrom through a discharge conduit 28.

Figure 3:
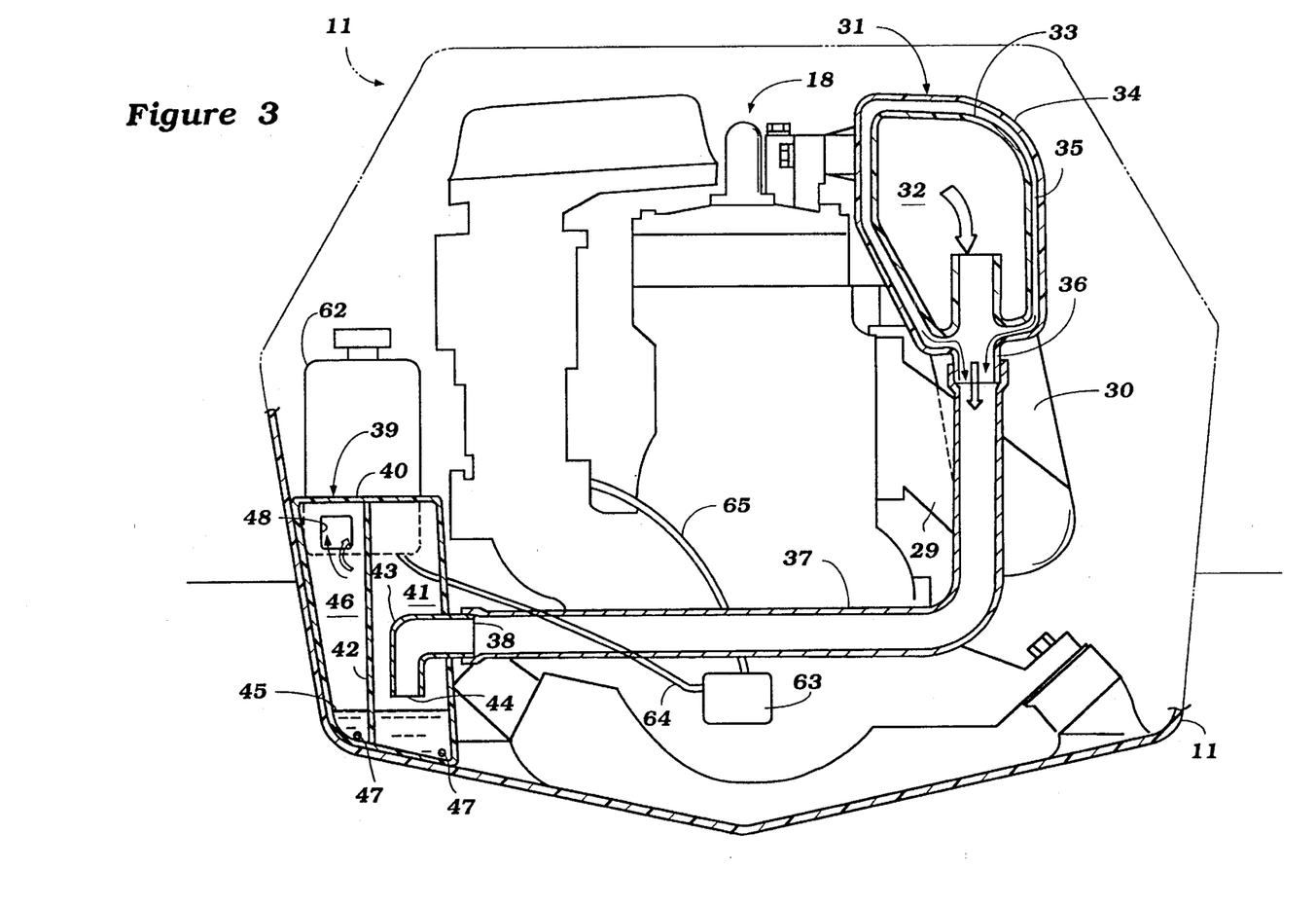
FIG. 3 is an enlarged cross-sectional view taken along the line 3—3 of FIG. 2.

Referring to FIG. 3, the exhaust system includes an exhaust manifold 29 that receives the exhaust gases from the engine and delivers them through an exhaust pipe 30 to a first expansion chamber device or housing, indicated generally by the reference numeral 31. The exhaust pipe 30 and first expansion chamber housing 31 may be of the general type described in co-pending application Ser. No. 412,850, filed Sep. 26, 1989, entitled EXHAUST COOLING DEVICE FOR SMALL-SIZED BOAT, filed in the name of Ryoichi Nakase assigned to the assignee of this application. That disclosure is incorporated herein by reference and, for that reason, a further description of this device is believed to be unnecessary. However, the housing 31 includes an internal expansion chamber 32 which is surrounded by a first wall member 33 and an outer wall member 34. The wall members 33 and 34 define between them a cooling jacket 35. The cooling jacket 35 receives coolant which has been delivered to cooling jacket 35 of the exhaust manifold 30 by the conduit 28 shown in FIG. 2. Device 31 and exhaust pipe 30 are also shown in FIG. 2.

In FIG. 3, the outer wall member 34 has an outlet nipple 36 which communicates with a flexible conduit 37. It should be noted that the coolant from the cooling jacket 35 also will be discharged through this nozzle 36 to the conduit 37. The conduit 37 extends across the width of watercraft 11, and is coupled to an inlet fitting 38 of a second expansion chamber device or housing, indicated generally by the reference numeral 39 and located on the starboard side of watercraft 11 and constructed in accordance with a first embodiment of the invention. Since the second expansion chamber device 39 is connected to the engine 18 only through the flexible conduit 37, the expansion chamber device 39 is described herein as being supported within the hull independently of the engine 18. This is because the expansion chamber device 39 derives no direct support from the engine 18.

The expansion chamber housing, or silencer, 39 is comprised of an external surface 40 that has a generally box-like configuration and which may be formed from a suitable material such as a fiberglass reinforced resin or the like. The interior of the housing 39 is divided into a chamber 41 by a generally vertically extending wall 42. The inlet fitting 38 is formed at one end of a generally L-shaped pipe 43 that delivers exhaust gases in a downward direction into this chamber 41. The L-shaped pipe 43 has a discharge end 44 that is disposed above a level 45 of water present in expansion chamber 41.

Another chamber 46 is visible from the rearward looking perspective and is adjacent chamber 41. Both of the chambers 41 and 46, and the whole of expansion chamber housing 39 is located forward within water craft 11. Near the bottom of each of the chambers 41 and 46 are small openings, or weep holes 47, below the indicated water level 45.

At the upper portion of expansion chamber housing 39 is a communicating opening 48. As will be shown in subsequent figures, expansion chamber housing 39 has a plurality of chambers in addition to chambers 41 and 46 visible in FIG. 3.

The sectional view of FIG. 3 bisects flexible conduit 37, as is made clear by reference to FIG. 1. There are portions fore and aft of the cross section illustrated in FIG. 3 of expansion chamber device 41.

Figure 4:
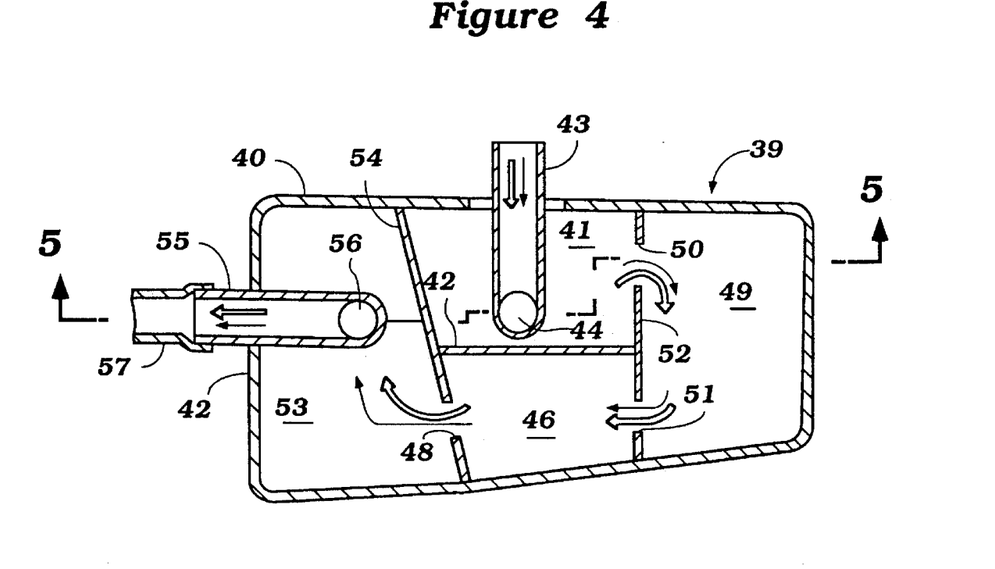
FIG. 4 is a top-sectional view taken about midway along the height of the expansion chamber device of the present invention.

Referring to FIG. 4, a top view, looking down onto the starboard side of watercraft 11, of expansion chamber housing 39, is shown. Visible from this perspective, and as was previously shown in FIG. 3, is the L-shaped pipe 43 extending into and terminating downwardly within chamber 41. Vertically extending wall 42 can be easily seen separating chamber 41 from chamber 45. The opening 48, which is visible in FIG. 3, is shown adjacent of chamber 46. In addition, at the fore side of expansion chamber housing 39, a chamber 49 is in communication with chamber 41 through an opening 50. Chamber 49 is also in communication with chamber 46 through an opening 51. Chamber 49 is generally defined by a vertical wall 52.

Aft of L-shaped pipe 43 of FIG. 4, a chamber 53 is generally separated from chambers 41 and 46 by means of a vertical wall 54. A second L-shaped pipe 55 extends through the surface 40 of expansion chamber housing 39, and aftward. L-shaped pipe 55 has an opening 56 disposed near water level 45. L-shaped pipe 55 extends into an exhaust pipe 57 and continues aftward, away from expansion chamber housing 39. Note that L-shaped pipes 43 and 55 are oriented at a right angle with respect to each other. Thus, in FIG. 4 we can see that exhaust gases enter through L-shaped pipe 43 into chamber 41. The exhaust gases then travel from chamber 41 to chamber 49 to chamber 46, chamber 53, and exit chamber 53 by means of L-shaped pipe 55 and exhaust pipe 57.

Figure 5:
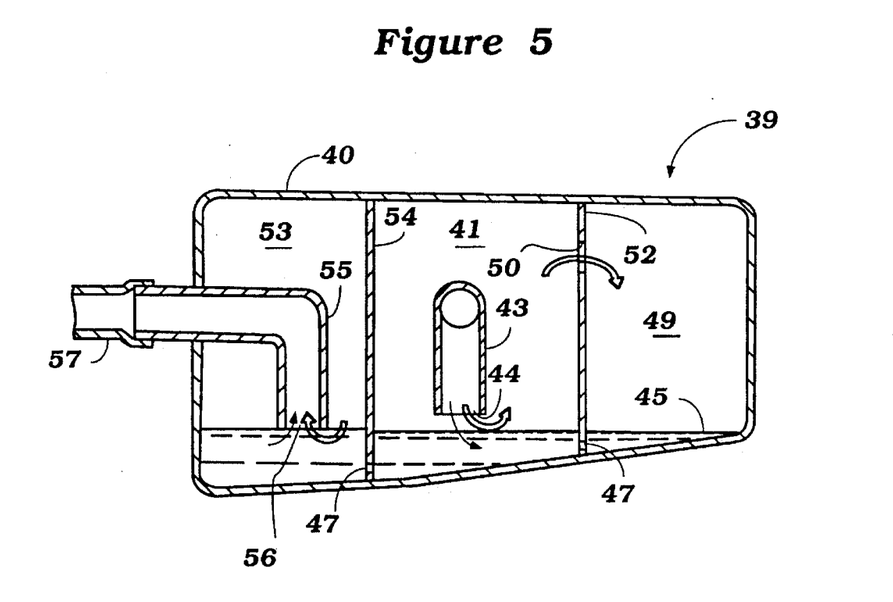
FIG. 5 is a cross-sectional view taken along the line 5—5 of FIG. 4.

Referring to FIG. 5, a view taken along line 5—5 of FIG. 4 is illustrated. The orientation of FIG. 5 is a view looking inward with respect to watercraft 11 from the starboard side. In FIG. 5, the even appearance of expansion chamber housing 39 is due to the step-like line segment which defines section 5—5 in FIG. 4. Visible are chambers 53, 41, and 49. Also present are small apertures or weep holes 47, which provide a substantially even water level 45 and a balancing access to all of the chambers. It is seen that a mixture of both gaseous and liquid exhaust enters chamber 41 via L-shaped pipe 43. The gaseous exhaust is transported among the chambers 41, 49, and 46 (not shown in FIG. 5) through upper openings such as openings 50 and 51 in wall 52 and opening 48 in wall 54. In chamber 53, both the liquid and gaseous exhaust makes its way up into L-shaped pipe 55 and exits aftward through exhaust pipe 57.

Referring back to FIG. 2, the exhaust pipe 57 and specifically its discharge end 58 discharges through the rear of watercraft 11. Exhaust pipe end 58 is above the water level to ensure that water cannot flow back into the exhaust system through the end 58. Also, any water which may splash into the end 58 cannot re-enter the expansion device housing 39 since there is a long, uphill run to L-shaped pipe 55. In addition, the downward disposition of the L-shaped pipes prevent water from being forced back through the exhaust silencing system. Upon the occurrence of a capsize condition, even though water may pass freely between chambers 41, 49, 45 and 53, the water will have difficulty reaching end 44 of L-shaped pipe 43.

FIGS. 6–12 illustrate alternate embodiments of expansion chamber housing 39 of the present invention. In FIGS. 6–10, the L-shaped pipe 43 and L-shaped pipe 55 enter and exit expansion chamber housing 39 at the same relative points as was shown in FIGS. 3–5. In FIGS. 6–10, the placement of the vertical walls differ.

Figure 6:
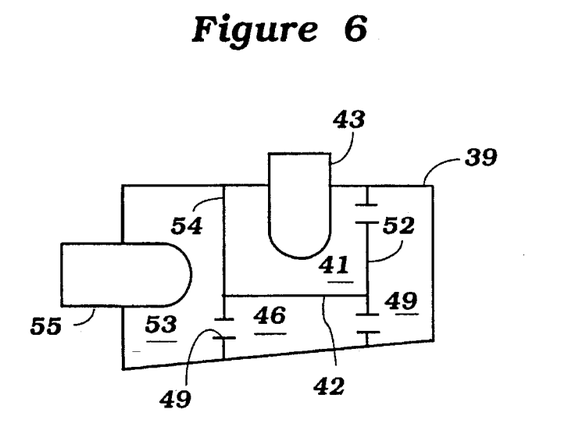
FIG. 6 is a second embodiment of the expansion chamber devices of FIGS. 2–5.

Referring to FIG. 6, vertical walls 54 and 52 are approximately parallel. Vertical wall 42 intersects with vertical walls 52 and 54 at approximately a right angle.

Figure 7:
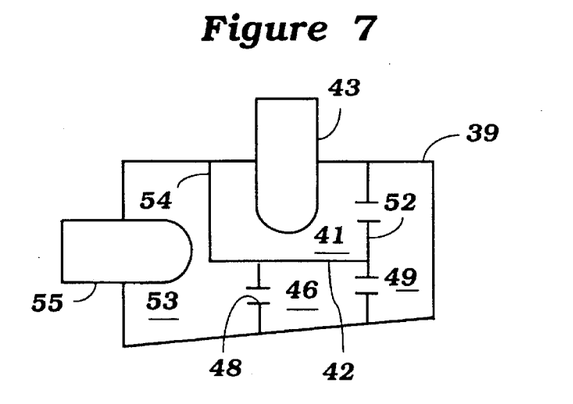
FIG. 7 is a third embodiment of the expansion chamber devices of FIGS. 2–5.

Referring to FIG. 7, vertical walls 52 and 54 are still shown as being substantially parallel, but a section of wall 54 and its opening 48 has been moved farther forward causing chamber 53 to assume a slight "L" shape.

Figure 8:
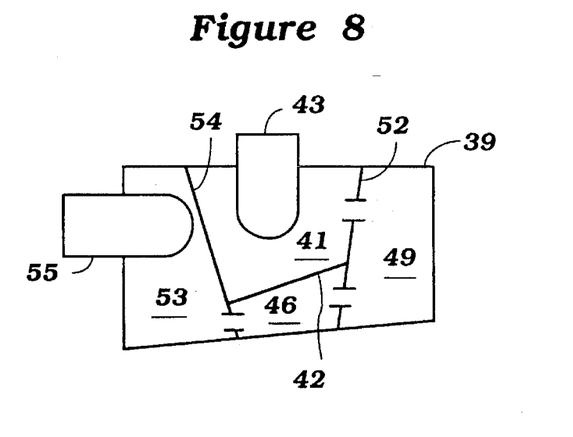
FIG. 8 is a fourth embodiment of the expansion chamber devices of FIGS. 2–5.

Referring to FIG. 8, vertical walls 54 and 42 still intersect at a right angle, but are somewhat counterclockwise rotated about a vertical axis with respect to vertical wall 52. In addition, vertical wall 52 has been turned slightly clockwise about its midpoint and intersects vertical wall 42 at an obtuse angle.

Figure 9:
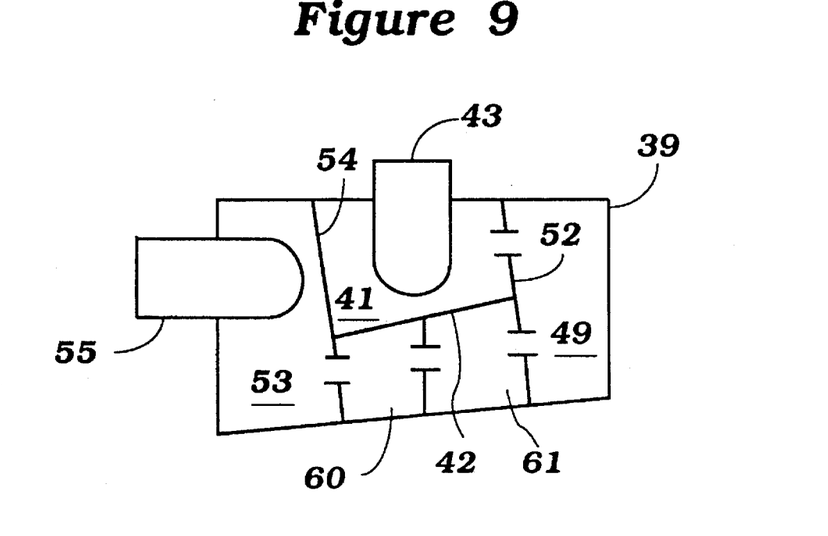
FIG. 9 is a fifth embodiment of the expansion chamber devices of FIGS. 2–5.

Referring to FIG. 9, an additional vertical wall 59 has been interposed between vertical walls 52 and 54, further subdividing what was chamber 45 in FIGS. 4–8 into chambers 60 and 61.

Figure 10:
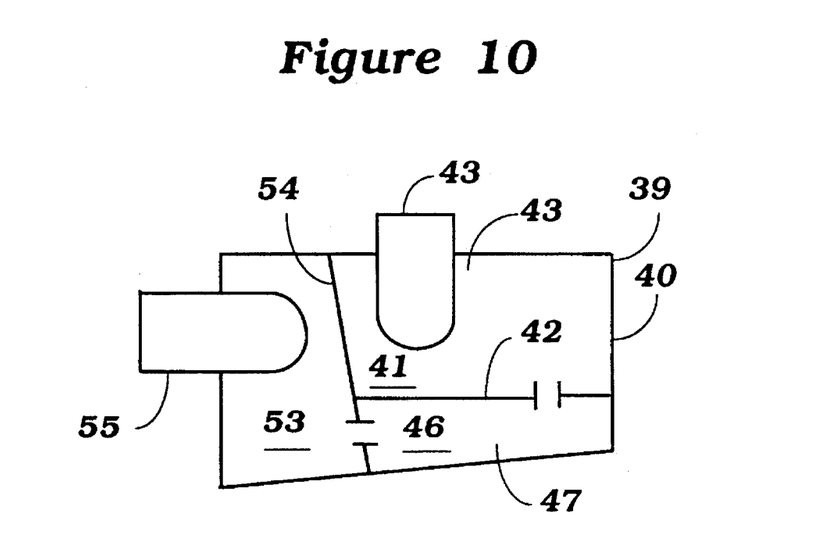
FIG. 10 is a sixth embodiment of the expansion chamber devices of FIGS. 2–5.

FIG. 10, however, illustrates the removal of vertical wall 52 present in FIGS. 4–9. L-shaped pipe 43 is in communication with a chamber 41. Vertical wall 42 extends from vertical wall 54 completely to the surface 40 of second expansion chamber housing 39. Chamber 49 is thus eliminated, vertical wall 42 dividing chambers 41 and 46. Chamber 53 is still visible in fluid communication with L-shaped pipe 55.

Figure 11:
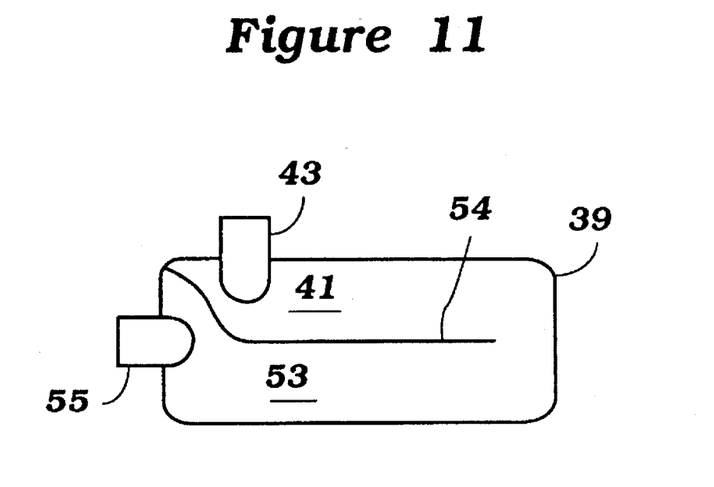
FIG. 11 is a schematic top plan view of a seventh embodiment of an expansion chamber device.
Figure 12:
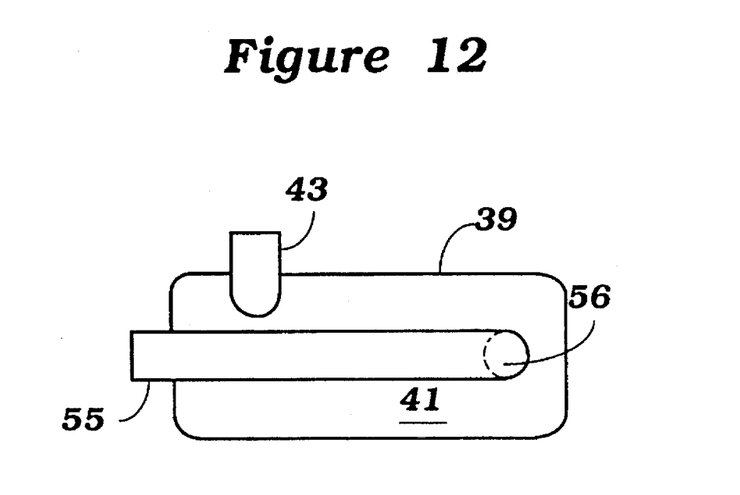
FIG. 12 is a top plan view of an eighth embodiment of an expansion chamber device.

FIGS. 11 and 12 illustrate further embodiments of the present invention, wherein the second expansion chamber housing 39 is expanded forward and may have a larger volume than the expansion chamber 39 of FIGS. 4–10. In FIG. 11, the L-shaped pipes 43 and 55 have a slightly different relationship to each other and are in communication with chamber 41 and 43, which are divided by wall 54. Referring to FIG. 12, an elongated L-shaped pipe 55, as well as L-shaped pipe 43, both communicate with a single chamber 41.

In each of the foregoing second expansion chamber housings 39, the size, shape and orientation of the various internal chambers will be effective depending upon the frequency characteristic of the exhaust of engine 18 and its exhaust through-put rate. The liquid or water level present in expansion chamber housing 39 will determine the remaining space for gaseous occupation, and thus also become a determiner of the characteristics of expansion chamber housing 39.

This alternate construction permits each of these expansion chambers to be tuned slightly differently so that to further extend the range of silencing provided for by the device. However, the general construction of this embodiment is the same as those previously described and for that reason, components which are the same have been identified by the same reference numerals. In the drawings, the open arrows indicate the flow of exhaust gases through the system and the solid arrows indicate the flow of water from the cooling system of the engine through the exhaust system.

In addition, the exhaust system of the present invention is seen relative to the lubrication system as would be present on a small water craft. Just aft of expansion chamber housing 39 of FIG. 2 is an oil tank 62. At the starboard side of the water craft 11 of FIG. 3, expansion chamber housing 39 can be seen located in front of an oil tank 62. Also visible in FIG. 3 is an oil pump 63 having an oil line 64 in fluid communication with the oil tank 62, and an oil line 65 in communication with the engine 18.

It should be readily apparent from the foregoing description that a very effective expansion unit is provided for silencing the exhaust gases of a marine propulsion unit and will provide a good silencing through a plurality of expansion and contractions. Of course, the described embodiments are preferred embodiments of the invention and various changes and modifications may be made without departing from the spirit and scope of the invention, as defined by the appended claims.

What is claimed is:

1. An exhaust silencer for a watercraft having a hull, an internal combustion engine positioned within said hull substantially along a longitudinal center plane thereof, said internal combustion engine having at least one exhaust port for discharge of exhaust gases from said engine, said silencer comprising a first expansion chamber housing on one side of said hull, said first expansion chamber housing defining at least one internal expansion volume, an inlet for receiving exhaust gases and delivering exhaust gases to said first expansion chamber expansion volume, and an outlet for discharge of exhaust gases from said first expansion chamber housing expansion volume, conduit means for delivering exhaust gases from said engine exhaust port to said first expansion chamber housing inlet, a discharge conduit having a first end connected to said outlet of said first expansion chamber housing and a second end, a second expansion chamber housing positioned on the other side of said hull from said one side, said second expansion chamber housing defining at least one internal expansion volume, an input connected to said second end of said discharge conduit for delivering exhaust gases from said discharge conduit to said expansion volume of said second expansion chamber housing, and an output for discharging exhaust gases from said second expansion chamber housing expansion volume to the atmosphere, at least one of said expansion chamber housings being supported within said hull independently of said engine.

2. The exhaust silencer of claim 1 wherein an elongate exhaust pipe extends from the second expansion chamber housing outlet along the other side of said watercraft throughout a substantial portion of the exhaust pipe length.

3. The exhaust silencer for a watercraft as recited in claim 1 wherein the discharge conduit is located forward of the engine in the hull.

4. The exhaust silencer for a watercraft as recited in claim 1 wherein said first and said second expansion chamber housings are balanced with respect to the longitudinal center plane of said hull.

5. The exhaust silencer of claim 1 wherein said second expansion chamber housing defines a plurality of expansion volumes communicating with each other through restricted openings for subjecting the exhaust gases flowing therethrough to plural expansions and contractions.

6. The exhaust silencer of claim 1 wherein said second expansion chamber housing input enters from a side of said second expansion chamber housing facing the longitudinal center plane of said hull and the outlet faces rearwardly so that said inlet and said outlet are at right angles to each other.

7. The exhaust silencer of claim 6 wherein the second expansion chamber housing is divided into a plurality of expansion chambers each communicating with the other through a restricted opening, said expansion chambers and said restricted openings being oriented so that exhaust gases flow in a series fashion through each of said expansion chambers from said inlet to said outlet to provide plural expansions and contractions of the exhaust gases flowing therethrough.

8. An exhaust silencer for a watercraft as recited in claim 1 wherein said inlets of said first and second expansion chamber housings are oriented at right angles with respect to the respective outlets thereof.

9. An exhaust silencer located within a hull of a watercraft for silencing of the exhaust gases of an internal combustion engine located separately from said exhaust silencer within said hull and propelling said hull, and said exhaust silencer comprising an outer housing defining an internal volume, means for locating said outer housing within said hull at a position spaced from said engine, a plurality of walls contained within said outer housing and dividing said outer housing into a plurality of expansion chambers, restricted gas flow openings in each of said walls for permitting flow between the expansion chambers defined in part by each wall and the outer housing, a single inlet conduit extending through one side of said outer housing and entering one of said expansion chambers for delivering all of the exhaust gases from said engine thereto, and a single outlet formed in said outer housing and extending at a right angle to said inlet and communicating with another of said expansion chambers for discharge of all of the engine exhaust gases from the outer housing to the atmosphere.

10. An exhaust silencer as set forth in claim 9 wherein there are at least four expansion chambers formed within the outer housing.

11. An exhaust silencer as set forth in claim 10 wherein first and second of expansion chambers are disposed on opposite ends of the outer housing and the third and fourth expansion chambers are disposed in side by side relationship between the first and second expansion chambers.

12. An exhaust silencer as set forth in claim 11 wherein the first, second, third and fourth chambers are in serial communication with each other through a plurality of apertures formed in said walls at the upper end thereof.

13. An exhaust silencer as set forth in claim 12 wherein engine cooling water is present along with exhaust gases delivered to said exhaust silencer inlet and wherein said walls are formed with restricted weep holes at the lower ends thereof for liquid communication of said first, second, third and fourth expansion chambers with each other and said weep holes permit water to flow therebetween to maintain a substantially same water level for each expansion chamber.

14. An exhaust silencer as set forth in claim 10 wherein said first, second, third and fourth expansion chambers communicate with each other through facing openings.

15. An exhaust silencer as set forth in claim 10 wherein the first, second, third and fourth expansion chambers having different volumes from each other.

* * * * *

UNITED STATES PATENT AND TRADEMARK OFFICE
CERTIFICATE OF CORRECTION

PATENT NO. : 5,550,337
DATED : August 27, 1996
INVENTOR(S) : Tazaki, et. al.

It is certified that error appears in the above-identified patent and that said Letters Patent is hereby corrected as shown below:

Claim 11, line 1, after "wherein", please insert "the"

Claim 11, line 2, please delete "of"

Claim 12, line 2, please change "fourth" to --fourth expansion--

Claim 15, line 2, please change "hav-" to --have--

Claim 15, line 3, please delete "ing"

Signed and Sealed this

Fifteenth Day of May, 2001

Attest:

NICHOLAS P. GODICI

Attesting Officer

Acting Director of the United States Patent and Trademark Office